(12) United States Patent
Schneider et al.

(10) Patent No.: US 8,057,768 B2
(45) Date of Patent: Nov. 15, 2011

(54) DEVICE FOR THE PURIFICATION OF DIESEL EXHAUST GASES

(75) Inventors: Wolfgang Schneider, Rodenbach (DE); Lothar Mussmann, Offenbach (DE); Gerald Jeske, Neuberg (DE); Michael Schiffer, Hanau (DE); Marcus Pfeifer, Solingen (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 12/226,857

(22) PCT Filed: Oct. 23, 2008

(86) PCT No.: PCT/EP2008/008995
§ 371 (c)(1),
(2), (4) Date: May 19, 2010

(87) PCT Pub. No.: WO2009/140989
PCT Pub. Date: Nov. 26, 2009

(65) Prior Publication Data
US 2010/0221161 A1 Sep. 2, 2010

(30) Foreign Application Priority Data
May 23, 2008 (EP) .................................... 08009493

(51) Int. Cl.
*B01D 53/94* (2006.01)
*F01N 3/10* (2006.01)
(52) U.S. Cl. ...................... 423/215.5; 423/213.7; 60/299
(58) Field of Classification Search .................... 60/299; 423/213.5, 213.7
See application file for complete search history.

(56) References Cited

U.S. PATENT DOCUMENTS

| 2004/0110628 A1 | 6/2004 | Kasahara et al. |
| 2007/0137187 A1* | 6/2007 | Kumar ........................... 60/299 |
| 2008/0119353 A1 | 5/2008 | Jia et al. |
| 2009/0137386 A1 | 5/2009 | Pfeifer et al. |
| 2009/0193796 A1* | 8/2009 | Wei et al. ....................... 60/297 |

FOREIGN PATENT DOCUMENTS

| DE | 10 2004 040549 | 2/2006 |
| EP | 1054722 A1 | 11/2000 |
| EP | 1 054 722 B1 | 12/2001 |
| WO | 2007/048971 A2 | 5/2007 |

OTHER PUBLICATIONS

PCT Notification Concering Transmittal of International Preliminary Examination Report on Patentability (Form PCT/IB/326) mailed Dec. 2, 2010 for Application No. PCT/EP2008/008995.
PCT International Preliminary Report on Patentability (Form PCT/IB/373) issued Nov. 23, 2010 for Application No. PCT/EP2008/008995 (in English language).
English translation of the PCT Written Opinion of the International Searching Authority (Form/ISA/237) issued Nov. 23, 2010 for Application No. PCT/EP2008/008995 w/ English language translation.
International Search report for Application No. PCT/EP2008/008995 dated Feb. 17, 2009 (in English language).
U.S. Appl. No. 12/611,440, filed Nov. 3, 2009, Bailey, et al.

* cited by examiner

*Primary Examiner* — Timothy Vanoy
(74) *Attorney, Agent, or Firm* — Smith, Gambrell & Russell, LLP

(57) ABSTRACT

The invention relates to a special device for the purification of diesel exhaust gases, which device comprises, in the flow direction of the exhaust gas, an oxidation catalyst, a diesel particle filter with catalytically active coating, and, downstream of a device for introducing a reducing agent from an external reducing agent source, an SCR catalyst. The oxidation catalyst and the catalytically active coating of the diesel particle filter contain palladium and platinum. The ratio of the noble metals platinum and palladium in the overall system and on the individual components, oxidation catalyst and catalytically coated diesel particle filter, are coordinated with one another in such a way as to obtain firstly an optimum $NO/NO_2$ ratio in the exhaust gas upstream of the downstream SCR catalyst, and secondly optimum heating and HC conversion behaviour during an active particle filter regeneration.

7 Claims, 3 Drawing Sheets

DEVICE FOR THE PURIFICATION OF DIESEL EXHAUST GASES

INTRODUCTION AND BACKGROUND

The invention relates to a special device for the purification of diesel exhaust gases, which device comprises, in the flow direction of the exhaust gas, an oxidation catalyst, a diesel particle filter with catalytically active coating, and, downstream of a device for introducing a reducing agent from an external reducing agent source, an SCR catalyst.

The untreated exhaust gas of diesel engines contains, in addition to carbon monoxide CO, hydrocarbons HC and nitrogen oxides $NO_x$, a relatively high oxygen content of up to 15% by volume. Said untreated exhaust gas also contains particle emissions which are composed predominantly of soot residues and possible organic agglomerates and which arise from partially incomplete fuel combustion in the cylinder.

Adhering to future legal exhaust-gas limits for diesel vehicles in Europe, North America and Japan, necessitates the simultaneous removal of particles and nitrogen oxides from the exhaust gas. The harmful gases carbon monoxide and hydrocarbons from the relatively lean exhaust gas can easily be made harmless by oxidation at a suitable oxidation catalyst. Diesel particle filters with and without an additional catalytically active coating are suitable units for the removal of the particle emissions. On account of the high oxygen content, the reduction of the nitrogen oxides to form nitrogen ("denitrogenization" of the exhaust gas) is more difficult. A known method is selective catalytic reduction (SCR) of the nitrogen oxides at a suitable catalyst, SCR catalyst for short.

Said method is presently the preferred option for the denitrogenization of diesel engine exhaust gases. The reduction of the nitrogen oxides contained in the exhaust gas takes place in the SCR method with the aid of a reducing agent which is introduced into the exhaust strand in a dosed fashion from an external source. As reducing agent, use is preferably made of ammonia or of a compound which releases ammonia, such as for example urea or ammonium carbamate. The ammonia, which is possibly generated in situ from the precursor compound, reacts at the SCR catalyst with the nitrogen oxides from the exhaust gas in a comproportionation reaction to form nitrogen and water.

At present, in order to satisfy the upcoming legal standards, a combination of the different exhaust-gas purification units is inevitable. A device for the purification of diesel engine exhaust gases must comprise at least one oxidationally active catalytic converter and, for denitrogenization, an SCR catalyst with an upstream device for introducing reducing agent (preferably ammonia or urea solution) and an external reducing agent source (for example an auxiliary tank with urea solution or an ammonia store). If it is not possible by optimizing the combustion within the engine to keep the particle emissions sufficiently low that they can be removed by means of the oxidation catalyst by direct oxidation with oxygen, the use of a particle filter is additionally necessary.

Corresponding exhaust-gas purification systems have already been described; some are presently at the practical testing stage.

For example, EP-B-1 054 722 describes a system for the treatment of $NO_x$ and particle-containing exhaust gases, in which system an oxidation catalyst is connected upstream of a particle filter. Arranged at the outflow side of the particle filter are a reducing agent source and a dosing device for the reducing agent, and an SCR catalyst. In the method described here, the $NO_2$ proportion in the exhaust gas and therefore the $NO_2/NO_x$ ratio is increased by means of the at least partial oxidation of NO at the oxidation catalyst, with the $NO/NO_2$ ratio preferably "being set to a predetermined level which is an optimum for the SCR catalyst".

Said $NO/NO_2$ ratio which is an optimum for the SCR catalyst is 1 for all presently known SCR catalysts. If the $NO_x$ contained in the exhaust gas is composed only of NO and $NO_2$, then the optimum $NO_2/NO_x$ ratio is between 0.3 and 0.7, preferably between 0.4 and 0.6 and is particularly preferably 0.5. Whether said ratio is attained upstream of the SCR catalyst in a system according to EP-B-1 054 722 is dependent on the exhaust-gas temperature and therefore on the operating state of the engine, on the activity of the oxidation catalyst and on the design and soot loading of the diesel particle filter which is connected downstream of the oxidation catalyst.

The untreated exhaust gas of conventional diesel engines contains only a very low proportion of $NO_2$ in the $NO_x$. The main proportion of the nitrogen oxides is nitrogen monoxide NO. As said untreated gas passes over the oxidation catalyst, NO is at least partially oxidized to form $NO_2$. The rate of $NO_2$ formation is dependent on the activity of the oxidation catalyst and on the exhaust-gas temperature. If a significant quantity of soot is deposited on the diesel particle filter which is arranged at the outflow side, then the $NO_2$ proportion present in the NO downstream of the oxidation catalyst is, with sufficient exhaust-gas temperature, further reduced. Since NO is predominantly formed from the $NO_2$ during the oxidation of soot with $NO_2$, however, no denitrogenization of the exhaust gas takes place as a result. Said denitrogenization must take place by means of the downstream SCR catalyst, for which purpose the $NO_2/NO_x$ ratio must be set to an optimum value over the entirety of oxidation catalyst and diesel particle filter. EP-B-1 054 722 however does not provide any technical teaching as to how said setting of the $NO_2/NO_x$ ratio in the exhaust gas upstream of the SCR catalyst can be realized over the entirety of the oxidation catalyst and filter.

SUMMARY OF THE INVENTION

It is an important object of the present invention to provide technical teaching for setting as optimum an $NO_2/NO_x$ ratio as possible in the exhaust gas upstream of the SCR catalyst in an exhaust-gas purification system of EP-B-1 054 722.

A further problem which is not discussed in EP-B-1 054 722 but which occurs in practice is that the "passive" particle filter regeneration which takes place in said system, that is to say the burning of soot, which takes place in situ, by oxidation with $NO_2$ generated by means of the oxidation catalyst, is generally not sufficient on its own to prevent the particle filter from becoming clogged with soot, and a resulting rise in the exhaust-gas back pressure to unacceptable values. Applied auxiliary measures are necessary, which may be carried out by means of the for example additional "active" diesel particle filter regenerations when the exhaust-gas back pressure across the particle filter exceeds a critical threshold value.

Said auxiliary measures include the additional injection of fuel into the exhaust strand upstream of the oxidation catalyst or into the cylinders of the combustion chamber during the exhaust piston stroke. The unburned fuel which passes into the exhaust gas from time to time by means of said device is burned across the oxidation catalyst with the release of heat; the oxidation catalyst is used as a "heating catalyst" in order to heat the downstream diesel particle filter to temperatures which lie considerably above the soot ignition temperature in the oxygen-containing atmosphere, that is to say in the range from 500 to 650° C. As a result of the temperature rise which is obtained in this way, the soot particles are "burned off" with the oxygen contained in the exhaust gas.

In order that the oxidation catalyst can operate as a "heating catalyst" in the "active" diesel particle filter regeneration, said oxidation catalyst must meet some demands with regard to conversion behaviour and ageing stability. Said oxidation catalyst must be able to convert high quantities of unburned hydrocarbons by oxidation in a short time without the oxidation reaction thereby being "flooded" and thus ceasing. Here, the conversion of the unburned hydrocarbons must be as complete as possible, since the breakthrough of unburned hydrocarbons through the oxidation catalyst can, at the latest at the SCR catalyst which is arranged further downstream, lead to the latter being contaminated. A breakthrough of unburned hydrocarbons at the end of the exhaust system may also have the result that the legal limits are not adhered to. The more fuel can be burned completely across the oxidation catalyst, the more flexible can be the strategy for active regeneration. Furthermore, it is an important requirement that the oxidation catalyst "ignites" even at low exhaust-gas temperatures (180 to 250° C.).

In summary, an oxidation catalyst which is also ideally suitable as a heating catalyst must therefore provide very high HC conversion rates even at extremely low exhaust-gas temperatures, wherein the HC conversion should increase as abruptly as possible to maximum values once the "ignition temperature" (light-off temperature) is reached. Furthermore, the catalyst must be sufficiently stable with regard to ageing that its activity is not impaired to too great an extent as a result of the exothermic energy generated during the combustion of the hydrocarbons. Said performance demands are referred to below in summary as "heat-up performance".

It is a further important object of the present invention to provide an exhaust-gas purification system having the basic design described in EP-B-1 054 722, in which the oxidation catalyst exhibits the best possible "heat-up performance" in the case of an "active" particle filter regeneration.

The two stated objects are achieved by a device for the purification of diesel exhaust gases, which device comprises, in the flow direction of the exhaust gas, an oxidation catalyst, a diesel particle filter with catalytically active coating, a device for introducing a reducing agent from an external reducing agent source, and an SCR catalyst, wherein the oxidation catalyst and the catalytically active coating of the diesel particle filter contain palladium and platinum. The device is characterized in that the ratio of the total quantity of palladium to the total quantity of platinum is between 8:1 and 1:15, with the ratio of platinum:palladium in the oxidation catalyst at the same time being no greater than 6:1, while the ratio of platinum:palladium in the catalytically active coating of the diesel particle filter is no lower than 10:1.

With the device according to the invention, it is firstly ensured that as optimum an $NO_2/NO_x$ ratio as possible prevails in the vast majority of operating states, which are typical for diesel vehicles, in which significant nitrogen oxide contents are present in the exhaust gas to be purified. Secondly, it is ensured that the oxidation catalyst has a sufficiently good "heat-up performance" in order to permit an "active" diesel filter regeneration at important operating points.

The invention is based on the following knowledge:

It is known that oxidation catalyst with high levels of platinum content cause high conversion rates in diesel exhaust gases in the oxidation of NO to form $NO_2$. It is also known that oxidation catalysts which have a large amount of palladium can provide extremely complete conversion of high quantities of unburned hydrocarbons in the diesel exhaust gas even at low temperatures. Unfortunately, catalysts with high levels of platinum content have the tendency to "go out" in the event of high prevailing levels of hydrocarbon content, while palladium does not have a sufficient level of NO oxidation activity. There is a conflict of aims here between firstly the demanded NO conversion performance of a catalytic converter and secondly its "heat-up performance". For cost reasons alone, said conflict cannot be resolved by means of a simple "addition" of the two noble metals palladium and platinum in the oxidation catalyst.

The inventors have now established that it is advantageous if the significant contribution to the formation of $NO_2$ takes place as the exhaust-gas flow is conducted across the diesel particle filter. This is surprising in that it has hitherto been assumed that a sufficient degree of "passive" filter regeneration can be obtained only by means of high rates of $NO_2$ formation across the oxidation catalytic converter in order to keep the number of supplementary "active" diesel particle filter regenerations as low as possible. The work of the inventors however suggests that an excess expenditure in "active" particle filter regenerations can be avoided with targeted distribution of the noble metals platinum and palladium over the oxidation catalyst and particle filter, and a good "heat-up performance" of the oxidation catalyst can be ensured while simultaneously setting an optimized $NO_2/NO_x$ ratio in the exhaust gas upstream of the SCR catalyst.

It has surprisingly been found that the overall quantity of noble metal in the device according to the invention has a secondary influence on the $NO_2/NO_x$ ratio which can be obtained downstream of the particle filter. In contrast, the platinum:palladium ratio and the distribution of the noble metals platinum and palladium over the exhaust-gas purification units oxidation catalyst and particle filter are of significance for the $NO_2$ formation properties.

In contrast, it has been found that the "heat-up performance" of the oxidation catalyst is improved with increasing noble metal content of the oxidation catalyst, assuming that the ratio of platinum:palladium in the oxidation catalyst does not exceed a value of 6:1. The ratio of platinum:palladium in the oxidation catalyst is preferably between 0.5:1 and 3:1, particularly preferably between 1:1 and 2.5:1. In order to simultaneously obtain an $NO_2/NO_x$ ratio downstream of the diesel particle filter which is as optimum as possible for the downstream SCR catalyst, it is necessary for the ratio of platinum:palladium in the catalytically active coating of the diesel particle filter to be no lower than 10:1. The ratio of platinum to palladium in the catalytically active coating of the diesel particle filter is between 12:1 and 14:1 in preferred embodiments.

If said boundary conditions are adhered to, the ratio of the overall quantity of palladium to the overall quantity of platinum in the device may be varied over a very wide range, specifically between 8:1 and 1:15, preferably between 2:1 and 1:10 and particularly preferably between 1:1 and 1:7, as a result of which it is possible to provide cost-optimized exhaust systems for practically all diesel vehicles which are presently in use and at the testing stage and for may future diesel vehicles.

The oxidation catalyst and diesel particle filter are typically present in the form of two separate components. Said components may possibly be accommodated in one housing, for example if only a small amount of installation space is available in the exhaust system of a diesel passenger motor vehicle. It is likewise possible for said components to be positioned in two different housings at different positions (close to the engine and/or on the underbody of the vehicle).

The oxidation catalyst conventionally consists of a platinum- and palladium-containing catalytically active coating which is applied to a ceramic or metallic throughflow honeycomb body. Use is preferably made of ceramic throughflow honeycomb bodies which have cell densities of 15 to 150 cells per square centimeter, particularly preferably 60 to 100 cells per square centimeter. The duct wall thickness of preferred substrates is preferably between 0.05 and 0.25 millimeters, particularly preferably between 0.07 and 0.17 millimeters.

The diesel particle filter consists of a platinum- and palladium-containing catalytically active coating and a filter body. Metallic and ceramic filter bodies, for example metallic fabric and knitted bodies, are suitable as filter bodies. Wall-flow filter substrates composed of ceramic material or silicon carbide are preferably used. The platinum- and palladium-containing catalytically active coating is particularly preferably formed into the wall of such a wall-flow filter substrate composed of ceramic material or silicon carbide.

In the device according to the invention, an oxidation catalyst consisting of a platinum- and palladium-containing catalytically active coating on a ceramic or metallic throughflow honeycomb body, and a diesel particle filter consisting of a platinum- and palladium-containing catalytically active coating and a filter body, are suitably selected such that the volume ratio of throughflow honeycomb body to filter body is between 1:1.5 and 1:5. The volume ratio of the throughflow honeycomb body to filter body is preferably between 1:2 and 1:4.

In a device according to the invention platinum and palladium are contained in a catalytically active coating both in the oxidation catalyst and also in the diesel particle filter. The noble metals platinum and palladium are preferably provided on one or more oxidic support materials. They may be applied separately to, if appropriate, different support materials, or may be provided together on one or more support materials. Here, the support materials are selected from the group consisting of aluminium oxide, lanthanum-oxide-stabilized aluminium oxide, aluminosilicate, silicon dioxide, titanium dioxide, cerium oxide, cerium-zirconium mixed oxides, rare-earth-metal sesquioxide, zeolite and mixtures thereof. Aluminium oxide, lanthanum-oxide-stabilized aluminium oxide, aluminosilicate, titanium dioxide and zeolite are preferably used as support materials.

In the preferred embodiments of the oxidation catalyst, platinum and/or palladium are provided so as to be applied to aluminium oxide and/or aluminosilicate as support material. In the preferred embodiments of the diesel particle filter, platinum and/or palladium are provided so as to be applied to lanthanum-stabilized aluminium oxide. The catalytically active coating of the oxidation catalyst also preferably contains zeolite. Whether zeolite should also be present in the catalytically active coating of the diesel particle filter is dependent substantially on the field of application of the device according to the invention. If the device is to be used for the purification of diesel exhaust gases in passenger motor vehicles, then diesel particle filters which contain zeolite in the catalytically active coating are preferable. In utility vehicles, however, an effective zeolite proportion in the catalytically active coating of the diesel particle filter often leads to undesired disadvantages with regard to the dynamic pressure behaviour, for which reason zeolite-free diesel particle filters are often more suitable here.

The application of the noble metals to the stated, preferred support materials takes place using the conventional methods, which are known to a person skilled in the art, of injection, precipitation, the working process referred to as "incipient wetness" and other techniques known from literature. Which of the prior art methods is preferable in each case is dependent not least on the noble metal particle size which can be obtained using said methods and the target application.

It was observed that particularly high yields can be obtained in the NO oxidation on platinum-rich noble metal particles with a mean particle size of 5 to 10 nanometers. In order to generate such large, platinum-rich noble metal particles on the support material, it is for example possible to select a conventional precipitation-injection process using a noble metal precursor compound which sorbs only moderately on the support material. If a coating suspension produced in this way is formed into the wall of a wall-flow filter substrate, a catalytically activated diesel particle filter is generated which has an extremely high NO oxidation capacity in the newly-produced state. A component of said type is particularly suitable, in an exhaust-gas purification device according to the invention in combination with an oxidation catalyst which has a platinum:palladium ratio of no greater than 6:1, for the purification of diesel exhaust gases in applications with a very low operating temperature of the filter (mean temperature in NEDC<250° C.).

For high-temperature applications or for the purification of heavily particle-loaded exhaust gases, when frequent "active" diesel particle filter regenerations are necessary, it is in contrast of relatively great importance that the exhaust-gas purification device and therefore the exhaust-gas purification units have a high level of ageing stability. The noble-metal-containing components preferred for such an application may for example be generated in that the usually oxidic support material is moistened with a suitable aqueous solution of a noble metal precursor compound, such that the pores of said support material are filled but it remains free-flowing. The noble metal is then thermally fixed in the pores in a subsequent fast calcination process. The noble-metal containing powder components which result from such a process may be processed to form a coating suspension, and applied to or formed into a throughflow honeycomb body and/or filter body.

The application of the catalytically active coating to the throughflow honeycomb body and to the filter body, or the formation of said catalytically active coating into the wall of the wall-flow filter substrate takes place using the conventional dip coating process or pumping and suction coating process with subsequent thermal aftertreatment (calcination and, if appropriate, reduction with forming gas or hydrogen), which are sufficiently well-known from the prior art for these exhaust-gas purification units.

All previously known SCR catalysts may be used in the device according to the invention. Particularly suitable are vanadium-oxide-based SCR catalysts and iron-exchanged and/or copper-exchanged zeolite compounds, which are known from the prior art and are commercially available. Also suitable are transition-metal-oxide-based SCR catalytic converter technologies which contain for example cerium oxides or cerium-transition-metal mixed oxides and/or tungsten oxide.

The device is suitable for the purification of diesel exhaust gases and may preferably be used in motor vehicles. As the diesel exhaust gases are conducted through the device according to the invention under the conditions typical for this application, all the emissions contained in the diesel exhaust gas are reduced.

BRIEF DESCRIPTION OF DRAWINGS

The invention is explained in more detail below on the basis of some examples and figures, in which.

DETAILED DESCRIPTION OF INVENTION

Figure 1:
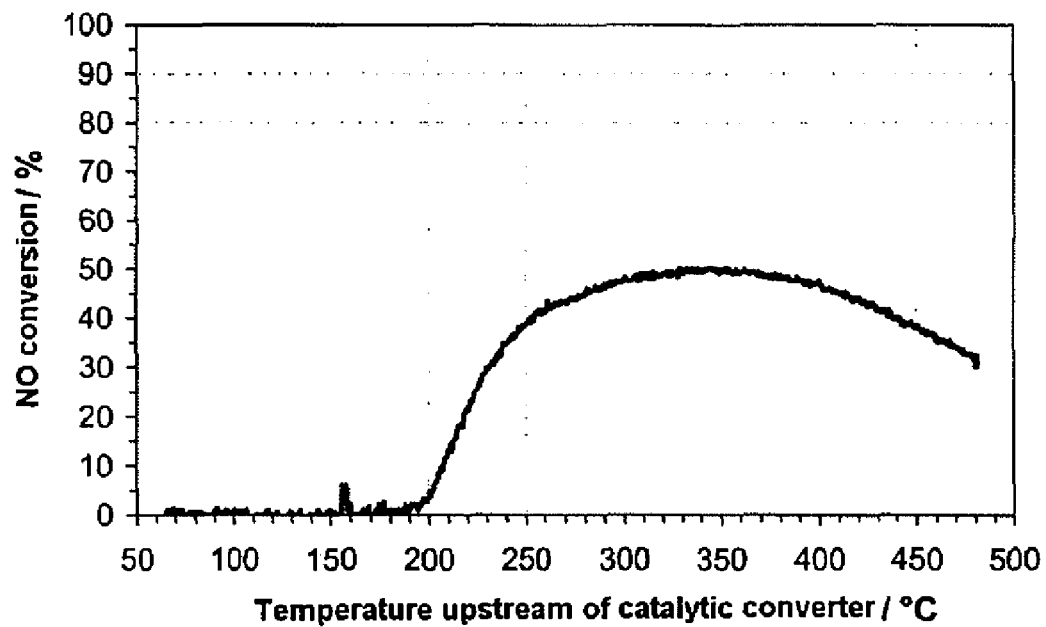
FIG. 1 shows the NO conversion in the model gas as a function of the temperature upstream of the catalyst as a typical measurement result in the determination of the mean $NO_2/NO_x$ ratio for the temperature range 200 to 400° C.; the mean $NO_2/NO_x$ ratio is obtained from this by determining the area under the Curve (integration) and dividing by it the sum of the same and the corresponding integral value above the curve (up to 100%) in the limits 200-400° C.

Tests in the Model Exhaust Gas:

For tests in the model exhaust gas, various oxidation catalysts and diesel particle filters were produced. Noble metal quantities and ratios were selected so as to result in the same noble metal costs for all the devices comprising an oxidation catalyst and diesel particle filter.

To produce oxidation catalysts according to the invention and comparative catalysts, homogeneous silicon-aluminium mixed oxide (5% by weight $SiO_2$ in relation to the overall mass of the mixed oxide; BET surface area: 150 m²/g) was moistened with an aqueous solution of tetraamineplatinum acetate and tetraaminepalladium nitrate such that the pores of said homogeneous silicon-aluminium mixed oxide were filled, with the powder remaining free-flowing. Here, the noble metal content of the solution and the noble metal ratio were selected corresponding to the target quantities and ratio (cf. table below) to be obtained in the catalysts to be produced. To fix the noble metal, the moist powder was calcined for a duration of 4 hours at 300° C. The catalytically activated powder obtained in this way was suspended in water, milled and applied, in a conventional dip coating process, to a cylindrical throughflow honeycomb body with a diameter of 118 millimeters and a length of 61 millimeters. The throughflow honeycomb body had 62 cells per square centimeter and a cell wall thickness of 0.17 millimeters. The resulting catalysts were calcined for a duration of 4 hours at 300° C. and subsequently treated with forming gas at 500° C. for a duration of 2 hours. The oxidation catalysts produced in this way are summarized in the following table:

| Catalytic converter identity | Total noble metal content [g/L] | Noble metal ratio Pt:Pd |
| --- | --- | --- |
| VDOC_A | 2.108 | 20:1 |
| VDOC_B | 0.773 | 20:1 |
| DOC_1 | 2.277 | 6:1 |
| DOC_2 | 2.229 | 6:1 |
| DOC_3 | 0.834 | 6:1 |
| DOC_4 | 2.103 | 2:1 |
| DOC_5 | 2.848 | 1:1 |

Remarks:
  The total noble metal content in grams is in relation to the volume of the catalyst.
  Catalytic converter identities with the prefix "DOC" denote catalysts according to the invention. Catalytic converter identities with the prefix "VDOC" denote comparative catalysts.

To produce the catalytically coated diesel particle filter required for the systems, a lanthanum-oxide-stabilized aluminium oxide (4% by weight $La_2O_3$ in relation to the total mass of the mixed oxide; BET surface area: 180 m²/g) was moistened with an aqueous solution of tetraamineplatinum acetate and tetraaminepalladium nitrate such that the pores of said homogeneous silicon-aluminium mixed oxide were filled, with the powder remaining free-flowing. Here, the noble metal content of the solution and the noble metal ratio were selected corresponding to the target quantities and ratio (cf. table below) to be obtained in the coated catalysts to be produced. To fix the noble metal, the moist powder was calcined for a duration of 4 hours at 300° C. The catalytically activated powder obtained in this way was suspended in water, milled and formed, in a conventional dip coating process, into the walls a cylindrical, ceramic wall-flow filter substrate (DURATRAP CO 200/12) with a diameter of 144 millimeters and a length of 152.4 millimeters. Here, a coating quantity to be applied was selected as 15 grams per litre in relation to the substrate volume. The wall-flow filter substrate had 31 alternately closed-off cells per square centimeter and a cell wall thickness of 0.3 millimeters. The resulting catalytically activated diesel particle filters were calcined for a duration of 4 hours at 300° C. and subsequently treated with forming gas at 500° C. for a duration of 2 hours. The following table shows which diesel particle filters were produced in which way:

| Catalytic converter system | Total noble metal content [g/L] | Noble metal ratio Pt:Pd |
| --- | --- | --- |
| VDPF_A | 0.176 | 4:1 |
| DPF_1 | 0.706 | 12:1 |
| DPF_2 | 0.177 | 12:1 |
| DPF_3 | 0.353 | 12:1 |
| DPF_4 | 0.265 | 14:1 |

Remarks:
  The total noble metal content in grams is in relation to the volume of the diesel particle filter.
  Catalytic converter identities with the prefix "DPF" denote diesel particle filters according to the invention. Catalytic converter identities with the prefix "VDPF" denote comparative parts.

The oxidation catalysts and diesel particle filters obtained in this way were subjected to a synthetic ageing process before being characterized. For this purpose, the parts were subjected, in a furnace at 750° C. for a duration of 16 hours, to an atmosphere composed of 10% by volume water vapour and 10% by volume oxygen in nitrogen.

For subsequent tests in the model gas, drilling cores with a diameter of 25.4 millimeters were taken from the oxidation catalysts and diesel particle filters treated in this way. The test specimens obtained in this way were combined to form the systems listed in the table below, and tested:

| System identity | Oxidation catalytic converter (Inflow side) | Diesel particle filter (Outflow side) | Total noble metal content [g/L] | Total noble metal ratio Pt:Pd | Volume ratio DOC:DPF |
|---|---|---|---|---|---|
| VSYS_1 | VDOC_A | VDPF_A | 0.729 | 12.5:1 | 1:2.5 |
| VSYS_2 | DOC_1 | VDPF_A | 0.777 | 5.6:1 | 1:2.5 |
| VSYS_3 | VDOC_B | DPF_1 | 0.725 | 13.7:1 | 1:2.5 |
| SYS_1 | DOC_2 | DPF_2 | 0.764 | 6.6:1 | 1:2.5 |
| SYS_2 | DOC_3 | DPF_1 | 0.743 | 9.2:1 | 1:2.5 |
| SYS_3 | DOC_4 | DPF_3 | 0.853 | 2.9:1 | 1:2.5 |
| SYS_4 | DOC_5 | DPF_4 | 1.003 | 1.4:1 | 1:2.5 |

Remarks:
The total noble metal content in grams is in relation to the volume of the exhaust-gas purification units.
System identities with the prefix "SYS" denote system configurations according to the invention. System identities with the prefix "VSYS" denote comparative systems.

The oxidation catalyst and diesel particle filter were installed into the reactor of a laboratory model gas system, wherein the oxidation catalyst was arranged at the inflow side and the diesel particle filter was arranged at the outflow side. First, the mean $NO_2/NO_x$ obtainable downstream of the diesel particle filter was determined. For this purpose, the following test conditions were set:

| Model gas composition | |
|---|---|
| CO [Vppm]: | 350 |
| HC (propene:propane = 2:1); [Vppm $C_1$]: | 270 |
| NO [Vppm]: | 270 |
| $H_2$ [Vppm]: | 120 |
| $CO_2$ [% by volume]: | 10.7 |
| $H_2O$ [% by volume]: | 10 |
| $O_2$ [% by volume]: | 6 |

| General reaction conditions | |
|---|---|
| Spatial velocity GHSV over the entire system [$h^{-1}$] | 38.700 |
| Temperature range tested [° C.]: | 100 to 450° C. |
| Temperature range evaluated [° C.]: | 200 to 400° C. |
| Heat-up rate [°/min]: | 14 |
| Conditions before start of measurement: | Heating to 500° C. at 35° C./min in the measurement gas, and cooling to 100° C. |
| Exhaust-gas analysis | |
| Online-determination of [ . . . ] downstream of diesel particle filter | CLD/Ecophysics |
| Online-determination of HC diesel particle filter: | Thermo-FID/ Emerson Analytical |

Figure 2:
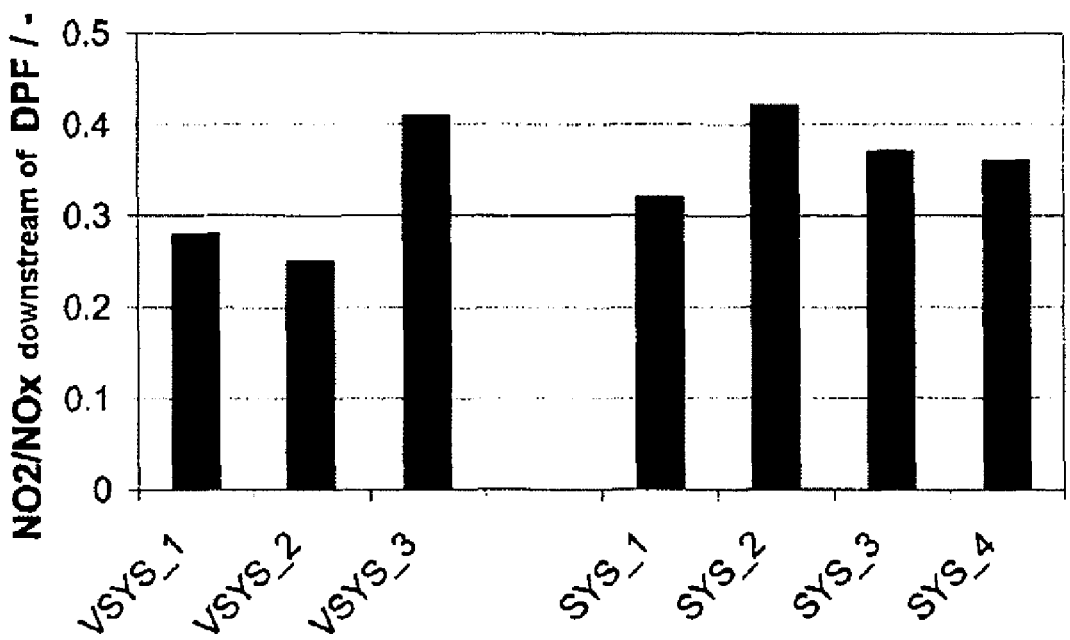
FIG. 2 shows the mean $NO_2/NO_x$ ratio 200-400° C. in the model exhaust gas downstream of the diesel particle filter in the systems SYS_1, SYS_2, SYS_3 and SYS_4 according to the invention and in the comparative systems VSYS_1, VSYS_2 and VSYS_3.

From the determination of the nitrogen oxide content and the NO or $NO_2$ content in the gas upstream of the inlet into the oxidation catalyst (dosing values) and downstream of the outlet out of the diesel particle filter (measured values), the NO conversion across the entire system (oxidation catalyst and diesel particle filter) was firstly determined as a function of the temperature. FIG. 1 shows a typical result by way of example. To determine the mean $NO_2/NO_x$ ratio set downstream of the diesel particle filter over the temperature range 200 to 400° C., the mean $NO_2$ proportion in the gas was determined, by integrating the NO conversion curve from 200° C. to 400° C., and placed in relation to the sum of itself and the area above the curve (up to 100%) in the same temperature range. FIG. 2 shows the $NO_2/NO_x$ ratio obtained in this way, which is obtained as an average over the tested systems in the temperature range from 200 to 400° C.

In a device according to Claim 1, in which a device for introducing a reducing agent from an external reducing agent source and an SCR catalyst for removing nitrogen oxides are arranged at the outflow side of the diesel particle filter, it is necessary, in order to ensure a continuously sufficient denitrogenization action of the downstream SCR catalyst, to obtain a $NO_2/NO_x$ ratio of between 0.3 and 0.7. A $NO_2/NO_x$ ratio of 0.5 is optimum. FIG. 2 shows that, in the comparative systems, the minimum ratio of 0.3 is attained only in the system VSYS_3. In contrast, all of the tested systems according to the invention attain the minimum $NO_2/NO_x$ ratio. The best results are obtained with the system SYS_2. In said system, the total Pd:Pt ratio is 1:9.2. The ratio Pt:Pd in the oxidation catalyst is 6:1. The ratio Pt:Pd in the catalytically active coating of the diesel particle filter is 12:1.

Furthermore, a so-called "heat-up experiment" was carried out with the systems. In a "heat-up experiment" of said type, it is tested how well the system composed of oxidation catalyst and diesel particle filter can convert a sudden, very high concentration of long-chain hydrocarbon compounds in the exhaust gas. For this purpose, at a defined time in an otherwise steady state, n-dodecane is dosed into the exhaust strand upstream of the oxidation catalyst, and it is measured how many hydrocarbons break through downstream of the diesel particle filter. The quotient of [dosing concentration-end breakthrough value] and dosing concentration also gives a steady-state on conversion value for the long-chain hydrocarbons, from which it is possible to derive the intensity with which the HC oxidation reaction proceeds under said aggravated conditions. If the reaction ceases (the oxidation catalyst "goes out"), said conversion end value is below 10%.

The table below summarizes the test conditions set in the "heat-up experiment":

| Model gas composition | |
|---|---|
| CO [Vppm]: | 350 |
| HC (dodecane); [Vppm $C_1$]: | 8000 |
| NO [Vppm]: | 500 |
| $H_2$ [Vppm]: | 120 |
| $CO_2$ [% by volume] | 10.7 |
| $H_2O$ [% by volume] | 10 |
| $O_2$ [% by volume] | 6 |
| General reaction conditions | |
| Spatial velocity GHSV over the entire system [$h^{-1}$] | 38.700 |
| Temperature [° C.] | 250° C. |
| Conditions before start of measurement: | Pre-treatment at 600° C./30 min in nitrogen |
| Exhaust-gas analysis | |
| Online-Bestimmung von $NO_x$, NO nach Dieselpartikelfilter: | CLD/Ecophysics |
| Online-determination of [ . . . ] downstream of diesel particle filter | Thermo-FID/ Emerson Analytical |

Figure 3:
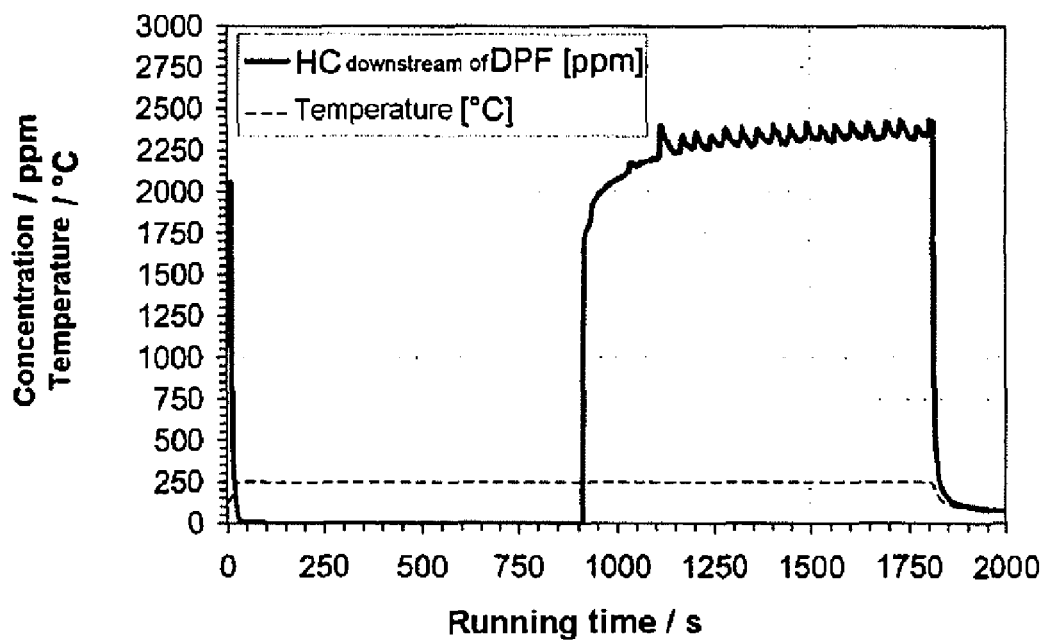
FIG. 3 shows the profile of the HC concentration downstream of the diesel particle filter as a function of the measurement time in a "heat-up experiment" in the model exhaust gas; the start of the n-dodecane dosing at t=900 s; temperature in the reactor=const.=250° C.; end of test at t=1800 s; for the assessment of the "heat-up performance", the magnitude of the HC breakthrough after the settling period (in the example shown, t=1500-1750 s) is specified.

FIG. 3 shows a typical result of such a measurement by way of example.

Figure 4:
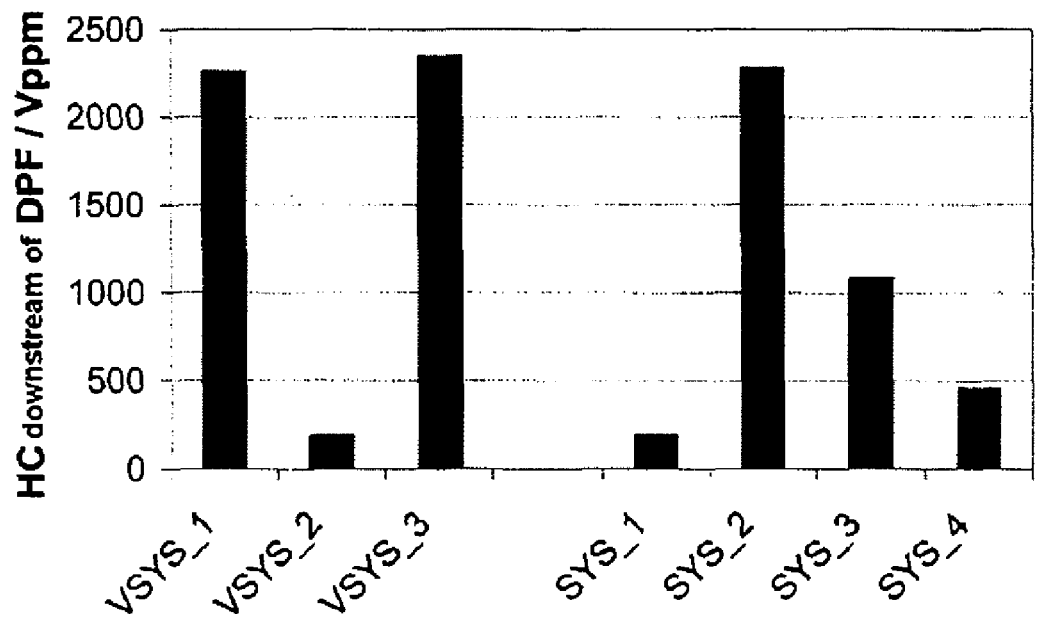
FIG. 4 shows the HC breakthrough [Vppm] in the "heat-up experiment" downstream of the diesel particle filter in the systems SYS_1, SYS_2, SYS_3 and SYS_4 according to the invention and in the comparative systems VSYS_1, VSYS_2 and VSYS_3.

FIG. 4 shows the results obtained for the tested systems, with the HC breakthrough end values being specified in [Vppm]. It can be clearly seen that the comparative system VSYS_3, which has the best mean $NO_2/NO_x$ ratio downstream of the diesel particle filter (see FIG. 2), also has, at 2350 Vppm, the highest HC breakthrough and therefore the poorest "heat-up performance". Unfortunately, a corresponding situation also applies tendentially to the system SYS_2 according to the invention. However, a cost-equivalent redistribution of the noble metal from the particle filter to the upstream oxidation catalyst while maintaining the noble metal ratios (→SYS_1) has the result, in such a system according to the invention, that the HC breakthrough can be lowered to far below 1000 Vppm (in this case: 190 Vppm) without the $NO_2/NO_x$ ratio thereby falling below the value of 0.3. Excellent "heat-up performance" is also obtained in the systems SYS_3 and SYS_4 according to the invention while maintaining good $NO_2/NO_x$ rates.

Figure 5:
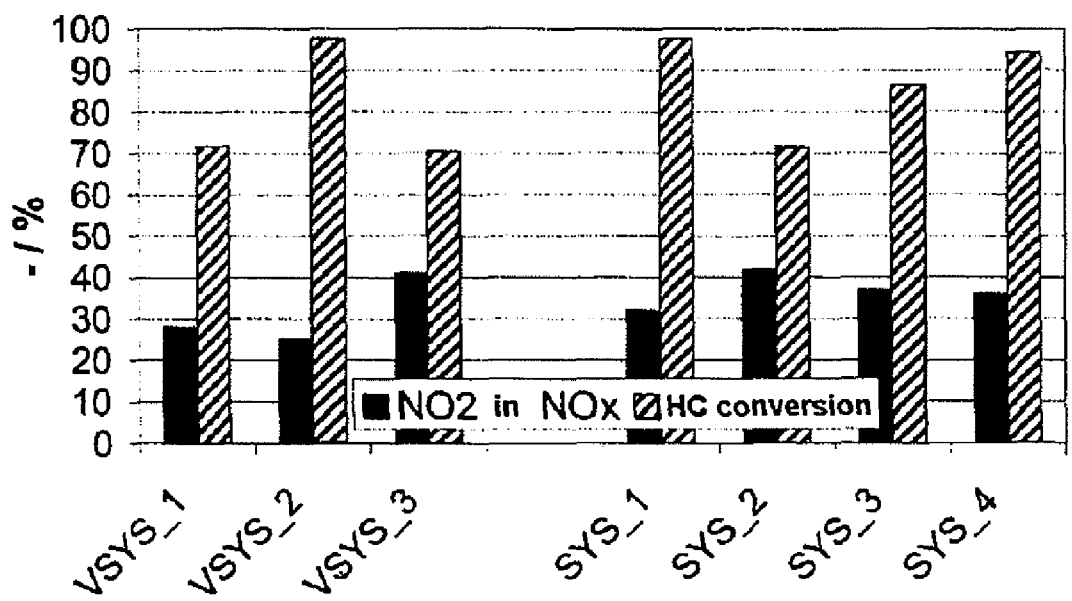
FIG. 5 shows the summarized result of the model gas tests—HC conversion [%] obtained over the entire system in the "heat-up experiment" and mean $NO_2/NO_x$ ratio in [% $NO_2$ in the $NO_x$] for the temperature range 200 to 400° C. in the systems SYS_1, SYS_2, SYS_3 and SYS_4 according to the invention and in the comparative systems VSYS_1, VSYS_2 and VSYS_3.

FIG. 5 summarizes all the model gas results obtained. The figure illustrates the HC conversion [%] obtained over the entire system in the "heat-up experiment", and for the mean $NO_2/NO_x$ ratio for the temperature range 200 to 400° C., corresponding values as a percentile $NO_2$ proportion in the $NO_x$. The detailed illustration shows that the conflict of aims between "heat-up performance" and sufficient $NO_x$ conversion under the given experimental boundary conditions can be best resolved using the systems SYS_3 and SYS_4 according to the invention.

In summary, it can be stated that all the objects stated in the introduction can be satisfactorily achieved by means of a system according to Claim 1. While adhering to the specified platinum:palladium ratios in the oxidation catalyst, diesel particle filter and overall system, it is possible, at all relevant operating points, to ensure a mean $NO_2/NO_x$ ratio downstream of the diesel particle filter and upstream of the SCR catalyst of at least 0.3 while simultaneously ensuring sufficiently good "heat-up performance" of the oxidation catalyst, which is arranged at the inflow side, during an "active" particle filter regeneration.

The invention claimed is:

1. Device for the purification of diesel exhaust gases, which device comprises, in the flow direction of the exhaust gas, an oxidation catalyst, a diesel particle filter with catalytically active coating, a device for introducing a reducing agent from an external reducing agent source, and an SCR catalyst, wherein the oxidation catalyst and the catalytically active coating of the diesel particle filter contain palladium and platinum,
   wherein the ratio of the total quantity of palladium to the total quantity of platinum is between 8:1 and 1:15, with the ratio of platinum:palladium in the oxidation catalyst at the same time being no greater than 6:1, while the ratio of platinum:palladium in the catalytically active coating of the diesel particle filter is no lower than 10:1.

2. Device according to claim 1,
   wherein the oxidation catalyst consists of a platinum- and palladium-containing catalytically active coating on a ceramic or metal throughflow honeycomb body, the diesel particle filter consists of a platinum- and palladium-containing catalytically active coating and a filter body, and the volume ratio of the throughflow honeycomb body to filter body is between 1:1.5 and 1:5.

3. Device according to claim 2,
   wherein the filter body is selected from the group of wall-flow filter substrates composed of ceramic material or silicon carbide.

4. Device according to claim 3,
   wherein platinum is applied to one or more oxidic support materials selected from the group consisting of aluminium oxide, lanthanum-oxide-stabilized aluminium oxide, aluminosilicate, silicon dioxide, titanium dioxide, cerium oxide, cerium-zirconium mixed oxides, rare-earth-metal sesquioxide, zeolite and mixtures thereof.

5. Device according to claim 3,
   wherein palladium is applied to one or more oxidic support materials selected from the group consisting of aluminium oxide, lanthanum-oxide-stabilized aluminium oxide, aluminosilicate, silicon dioxide, titanium dioxide, cerium oxide, cerium-zirconium mixed oxides, rare-earth-metal sesquioxide, zeolite and mixtures thereof.

6. Device according to claim 3,
   wherein platinum and palladium are applied to one or more oxidic support materials selected from the group consisting of aluminium oxide, lanthanum-oxide-stabilized aluminium oxide, aluminosilicate, silicon dioxide, titanium dioxide, cerium oxide, cerium-zirconium mixed oxides, rare-earth-metal sesquioxide, zeolite and mixtures thereof.

7. Method for the purification of diesel exhaust gases,
   wherein the diesel exhaust gases which are to be purified are conducted through a device according to claim 1.

* * * * *